(12) United States Patent
Moser et al.

(10) Patent No.: US 7,768,729 B2
(45) Date of Patent: Aug. 3, 2010

(54) METHOD, SYSTEM, AND COMPUTER PROGRAM PRODUCT FOR ESTIMATING ADJACENT TRACK ERASURE RISK BY DETERMINING ERASE BAND WIDTH GROWTH RATES

(75) Inventors: Andreas Moser, San Jose, CA (US); James Terrence Olson, Santa Cruz, CA (US); Bruce Alexander Wilson, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 353 days.

(21) Appl. No.: 12/023,980

(22) Filed: Jan. 31, 2008

(65) Prior Publication Data
US 2009/0195902 A1 Aug. 6, 2009

(51) Int. Cl.
*G11B 27/36* (2006.01)
(52) U.S. Cl. ...................................................... 360/31
(58) Field of Classification Search .................. 360/31, 360/77.02, 77.12, 78.14, 13, 53; 324/212; 712/2; 369/100
See application file for complete search history.

(56) References Cited

U.S. PATENT DOCUMENTS

| | | | | |
|---|---|---|---|---|
| 4,942,370 A | * | 7/1990 | Shigemori | 331/1 A |
| 5,107,482 A | * | 4/1992 | Goto et al. | 369/100 |
| 5,123,007 A | * | 6/1992 | Miyauchi et al. | 369/100 |
| 5,379,166 A | * | 1/1995 | Tsukada et al. | 360/78.14 |
| 5,448,551 A | * | 9/1995 | Miyagawa et al. | 369/275.1 |
| 5,963,029 A | | 10/1999 | Pressesky | 324/212 |
| 6,052,241 A | * | 4/2000 | Teranishi | 360/13 |
| 6,166,536 A | | 12/2000 | Chen et al. | 324/212 |
| 6,442,705 B1 | * | 8/2002 | Lamberts | 714/2 |
| 6,445,521 B1 | * | 9/2002 | Schaff et al. | 360/31 |
| 6,532,823 B1 | * | 3/2003 | Knapp et al. | 73/779 |
| 6,690,535 B2 | * | 2/2004 | Wang | 360/77.12 |
| 6,914,744 B1 | * | 7/2005 | Wang | 360/77.12 |
| 6,947,234 B2 | * | 9/2005 | Lamberts et al. | 360/53 |
| 6,975,468 B1 | | 12/2005 | Melrose et al. | 36/31 |
| 7,227,708 B2 | | 6/2007 | Feng | 360/31 |
| 7,242,550 B2 | | 7/2007 | Hara et al. | 360/77.02 |
| 2003/0081338 A1 | | 5/2003 | Wang et al. | 360/66 |
| 2006/0066971 A1 | | 3/2006 | Alex et al. | 360/31 |
| 2007/0074083 A1 | | 3/2007 | Olds et al. | 714/54 |

OTHER PUBLICATIONS

Li et al., "Erase band width evaluation by phase coherency" Journal of Applied Physics, vol. 91, No. 10, May 15, 2002.
Li et al., "Adjacent track encroachment analysis at high track density" Journal of Applied Physics, vol. 93, No. 10, May 15, 2003.

(Continued)

*Primary Examiner*—Fred Tzeng
(74) *Attorney, Agent, or Firm*—Zilka-Kotab, PC

(57) ABSTRACT

A method according to one embodiment comprises determining a growth rate of an erase band width between an aggressor track and a substantially unerased portion of a data track on a magnetic medium during a first number of write cycles on the aggressor track; and estimating the erase band width, or derived parameter thereof, for or after a second number of write cycles on the aggressor track, the second number of write cycles being greater than the first number of write cycles.

24 Claims, 13 Drawing Sheets

OTHER PUBLICATIONS

Jiang et al., "Cross-track noise profile measurement for adjacent-track interference study and write-current optimization in perpendicular recording" Journal of Applied Physics, vol. 93, No. 10, May 15, 2003.

Liu et al., "Skew Angle and Its Effect on Gb/in$^2$ Density Magnetic Recording" IEEE Transactions on Magnetics, vol. 32, No. 3, May 1996.

McKinstry et al., "Erase and Write Widths for Narrow Track High-Density Flexible Storage Media Applications" IEEE Transactions on Magnetics, vol. 38, No. 5, Sep. 2002.

Li et al., "Adjacent Track Erasure Analysis and Modeling at High Track Density" IEEE Transactions on Magnetics, vol. 39, No. 5, Sep. 2003.

Zhang, Kezhao, "Adjacent Track Interference Due to Side Reading and BER Performance" IEEE Transactions on Magnetics, vol. 40, No. 4, Jul. 2004.

Li et al., "Side-Track Erasure Processes in Perpendicular Recording" IEEE Transactions on Magnetics, vol. 42, No. 12, Dec. 2006.

\* cited by examiner

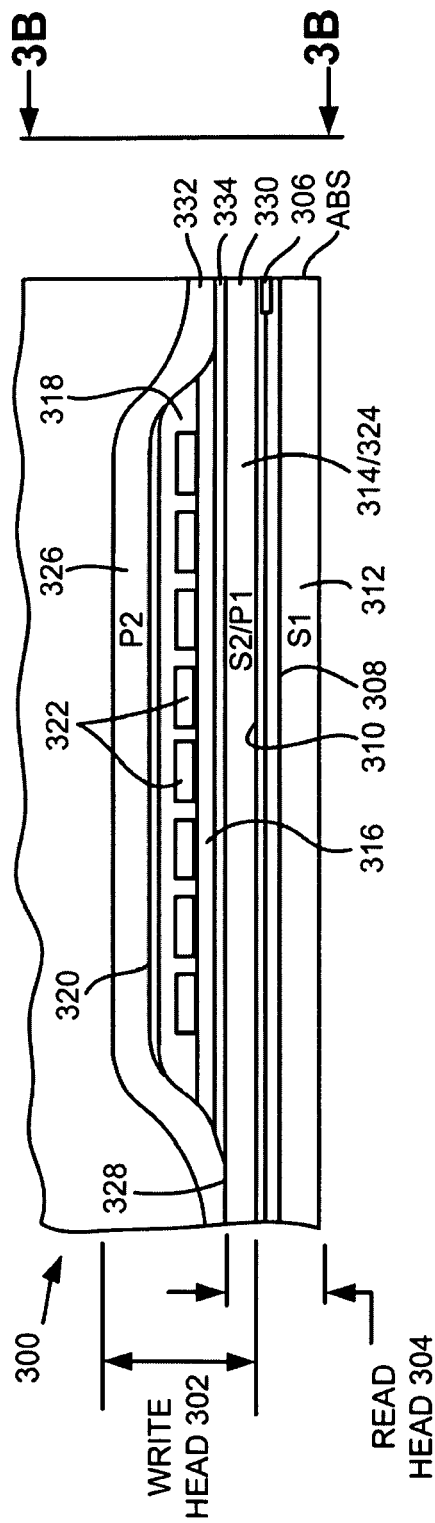
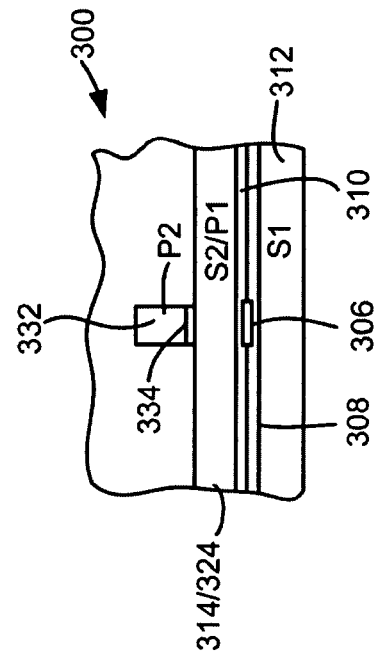
FIG. 3A
FIG. 3B

METHOD, SYSTEM, AND COMPUTER PROGRAM PRODUCT FOR ESTIMATING ADJACENT TRACK ERASURE RISK BY DETERMINING ERASE BAND WIDTH GROWTH RATES

FIELD OF THE INVENTION

The present invention relates to data storage systems, and more particularly, this invention relates to determining erase band growth rates of data storage systems.

BACKGROUND OF THE INVENTION

The heart of a computer is a magnetic disk drive which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write beads are connected to processing circuitry that operates according to a computer program to implement the writing and reading functions.

Data tracks are typically written to the disk in concentric tracks positioned at various radial locations. For reliability purposes, adjacent track erasure tests are often performed to determine how many writes to a given data track may be performed before an erasure of the adjacent track or tracks is detected. Typically, the minimum number of writes is in the tens or hundreds of thousands of writes. Accordingly, during adjacent track erasure testing, tens or hundreds of thousands of write and read cycles are performed. This is very time consuming, and thus costly, and usually must be done after a track pitch is determined.

SUMMARY OF THE INVENTION

A method according to one embodiment comprises determining a growth rate of an erase band width between an aggressor track and a substantially unerased portion of a data track on a magnetic medium during a first number of write cycles on the aggressor track; and estimating the erase band width, or derived parameter thereof, for or after a second number of write cycles on the aggressor track, the second number of write cycles being greater than the first number of write cycles.

A method according to another embodiment comprises estimating an erase band width, or derived parameter thereof, adjacent an aggressor track for a third number of write cycles on the aggressor track based on a log linear growth rate of the erase band width between first and second numbers of write cycles on the aggressor track, wherein the third number of write cycles is greater than the first number of write cycles, wherein the third number of write cycles is greater than the second numbers of write cycles.

A system according to another embodiment comprises logic or software for determining a growth rate of an erase band width between an aggressor track and a substantially unerased portion of a data track on a magnetic medium during a first number of write cycles on the aggressor track; and logic or software for estimating the erase band width, or derived parameter thereof, for or after a second number of write cycles on the aggressor track, the second number of write cycles being greater than the first number of write cycles. A computer program product embodied on a computer readable medium is also presented. The computer program product, when executed causes a computer to perform the following operations, comprising: determining a growth rate of an erase band width between an aggressor track and a substantially unerased portion of a data track on a magnetic medium during a first number of write cycles on the aggressor track; and estimating the erase band width, or derived parameter thereof, for or after a second number of write cycles on the aggressor track, the second number of write cycles being greater than the first number of write cycles.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 3A is a partial view of a merged magnetic head.

FIG. 3B is a partial ABS view, not to scale, of the slider taken along plane 3B-3B of FIG. 3A.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

The following description discloses several preferred embodiments of magnetic storage systems, as well as operation and/or component parts thereof and/or testing systems and methods for magnetic storage systems.

In one general embodiment, a method includes determining a growth rate of an erase band width between an aggressor track and a substantially unerased portion of a data track on a magnetic medium during a first number of write cycles on the aggressor track. Additionally, the erase band width, or derived parameter thereof, is estimated for or after a second number of write cycles on the aggressor track, the second number of write cycles being greater than the first number of write cycles.

In another general embodiment, a method includes estimating an erase band width, or derived parameter thereof, adjacent an aggressor track for a third number of write cycles on the aggressor track based on a log linear growth rate of the erase band width between first and second numbers of write cycles on the aggressor track, wherein the third number of write cycles is greater than the first number of write cycles, wherein the third number of write cycles is greater than the second numbers of write cycles.

In another general embodiment, a system includes logic or software for determining a growth rate of an erase band width between an aggressor track and a substantially unerased portion of a data track on a magnetic medium during a first number of write cycles on the aggressor track. Additionally, logic or software is provided for estimating the erase band width, or derived parameter thereof, for or after a second number of write cycles on the aggressor track, the second number of write cycles being greater than the first number of write cycles.

Figure 1:
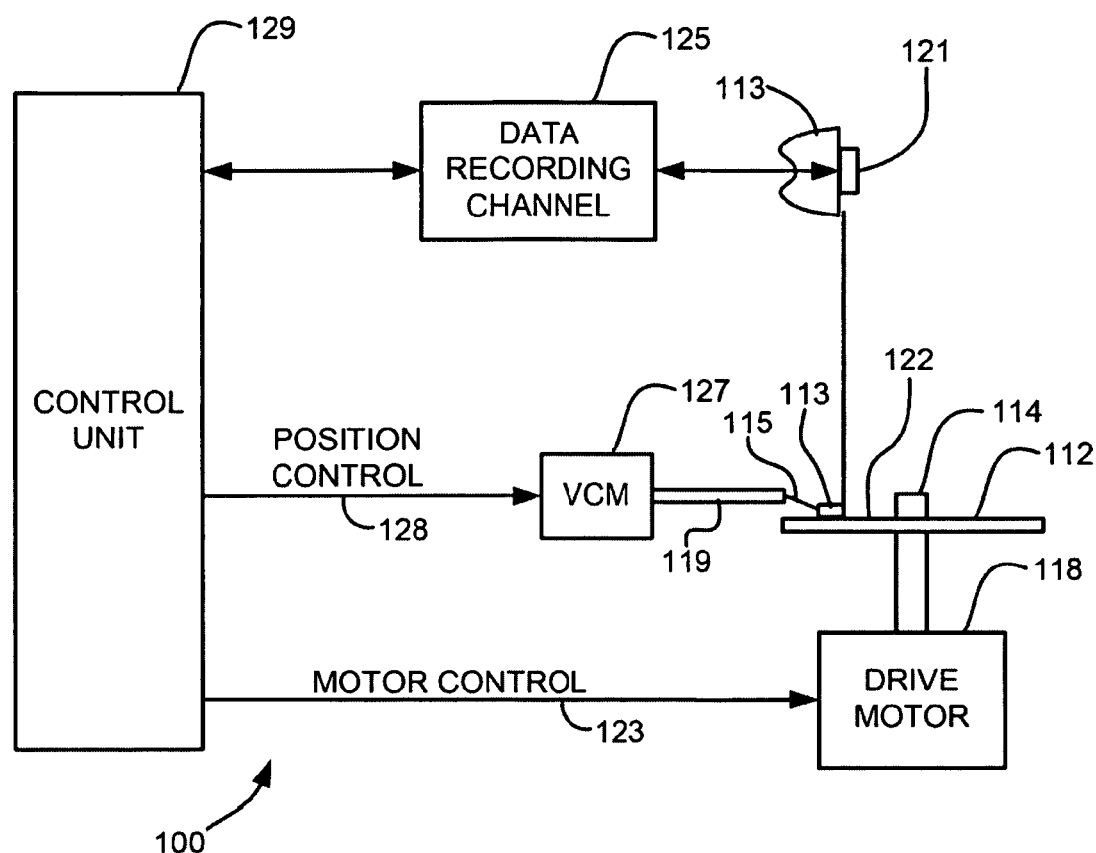
FIG. 1 is a simplified drawing of a magnetic recording disk drive system.

Referring now to FIG. 1, there is shown a disk drive 100 in accordance with one embodiment of the present invention. As shown in FIG. 1, at least one rotatable magnetic disk 112 is supported on a spindle 114 and rotated by a disk drive motor 118. The magnetic recording on each disk is in the form of an annular pattern of concentric data tracks (not shown) on the disk 112.

At least one slider 113 is positioned near the disk 112, each slider 113 supporting one or more magnetic read/write heads 121. As the disks rotate, slider 113 is moved radially in and out over disk surface 122 so that heads 121 may access different tracks of the disk where desired data are recorded. Each slider 113 is attached to an actuator arm 119 by means of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 are for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium. Since magnetic flux decays as it travels down the length of the narrow second pole tip, shortening the second pole tip will increase the flux reaching the recording media. Therefore, performance can be optimized by aggressively placing the flare point close to the ABS.

Figure 2A:
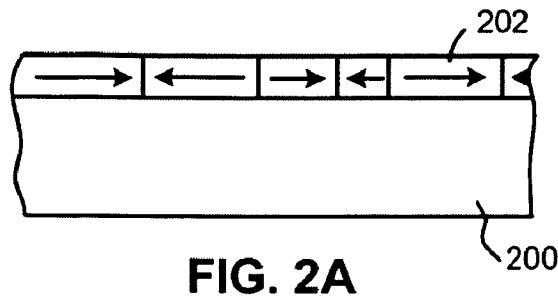
FIG. 2A is a schematic representation in section of a recording medium utilizing a longitudinal recording format.

FIG. 2A illustrates, schematically, a conventional recording medium such as used with conventional magnetic disc recording systems, such as that shown in FIG. 3A. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

Figure 2C:
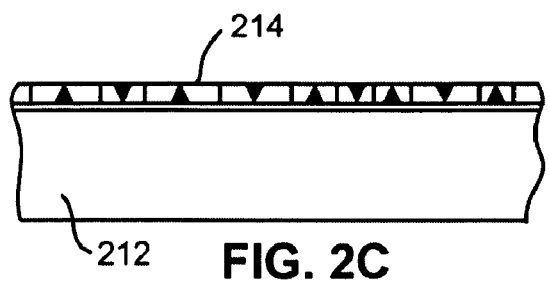
FIG. 2C is a magnetic recording medium utilizing a perpendicular recording format.
Figure 2B:
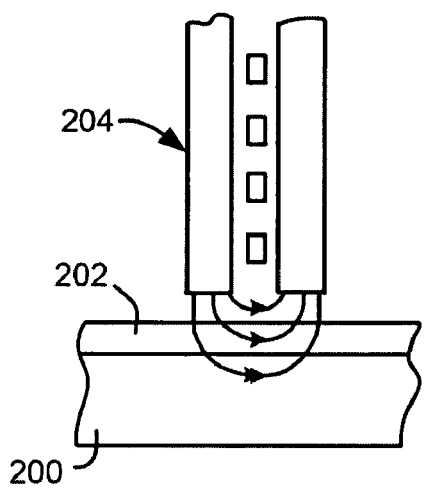
FIG. 2B is a schematic representation of a conventional magnetic recording head and recording medium combination for longitudinal recording as in FIG. 1.

FIG. 2B shows the operative relationship between a conventional recording/playback head 204, which may preferably be a thin film head, and a conventional recording medium, such as that of FIG. 2A.

FIG. 2C illustrates schematically the orientation of magnetic impulses substantially perpendicular to the surface of the recording medium. For such perpendicular recording the medium includes an under layer 212 of a material having a high magnetic permeability. This under layer 212 is then provided with an overlying coating 214 of magnetic material preferably having a high coercivity relative to the under layer 212.

Figure 2D:
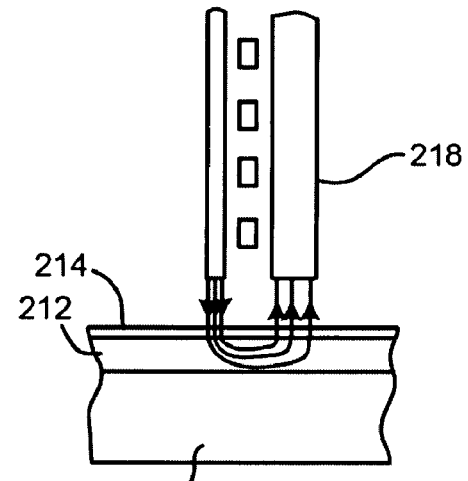
FIG. 2D is a schematic representation of a recording head and recording medium combination for perpendicular recording on one side.

Two embodiments of storage systems with perpendicular heads 218 are illustrated in FIGS. 2C and 2D (not drawn to scale). The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

By this structure the magnetic lines of flux extending between the poles of the recording head loop into and out of the outer surface of the recording medium coating with the high permeability under layer of the recording medium causing the lines of flux to pass through the coating in a direction generally perpendicular to the surface of the medium to record information in the magnetically hard coating of the medium in the form of magnetic impulses having their axes of magnetization substantially perpendicular to the surface of the medium. The flux is channeled by the soft underlying coating 212 back to the return layer (P1) of the head 218.

Figure 2E:
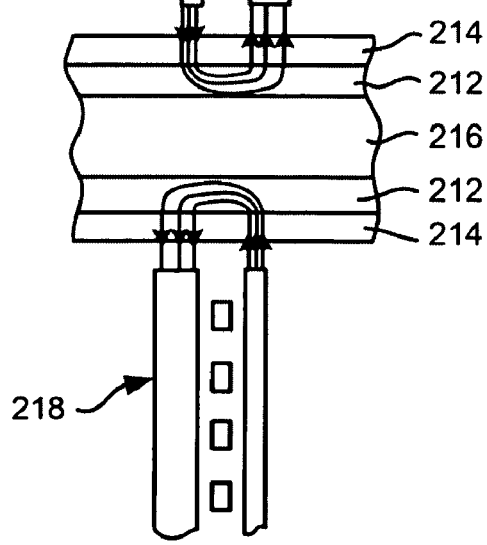
FIG. 2E is a schematic representation of the recording apparatus of the present invention, similar to that of FIG. 2D, but adapted for recording separately on both sides of the medium.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium.

FIG. 3A is a side cross-sectional elevation view of a merged magnetic head 300, which includes a write head portion 302 and a read head portion 304, the read head portion employing a spin valve sensor 306. FIG. 3B is an ABS view of FIG. 3A. The spin valve sensor 306 is sandwiched between nonmagnetic electrically insulative first and second read gap layers 308 and 310, and the read gap layers are sandwiched between ferromagnetic first and second shield layers 312 and 314. In response to external magnetic fields, the resistance of the spin valve sensor 306 changes. A sense current ($I_s$) conducted through the sensor causes these resistance changes to be manifested as potential changes. These potential changes may then be processed as readback signals by processing circuitry (e.g. processing circuitry of the control unit 129 shown in FIG. 1).

The write head portion 302 of the magnetic head 300 includes a coil layer 322 sandwiched between first and second insulation layers 316 and 318. Note that the coils 322 are only partially shown, additional portions thereof being present outside the diagram. A third insulation layer 320 may be employed for planarizing the head to eliminate ripples in the second insulation layer caused by the coil layer 322. The first, second and third insulation layers are referred to in the art as an "insulation stack".

The coil layer 322 and the first, second and third insulation layers 316, 318 and 320 are sandwiched between first and second pole piece layers 324 and 326. The first and second pole piece layers 324 and 326 are magnetically coupled at a back gap 328 and have first and second pole tips 330 and 332 which are separated by a write gap layer 334 at the ABS. Since the second shield layer 314 and the first pole piece layer 324 are a common layer this head is known as a merged head. In a piggyback head an insulation layer is located between a second shield layer and a first pole piece layer. First and second solder connections (not shown) connect leads (not shown) from the spin valve sensor 306 to leads (not shown) on the slider 113 (FIG. 1), and third and fourth solder connections (not shown) connect leads (not shown) from the coil 322 to leads (not shown) on the suspension.

As noted above, the data tracks on a disk are typically written in concentric fashion at various radial positions on the disk. Recurring writing and/or erasure of a given data track results in growth of an erase band adjacent the track being written. Eventually, the erase band may grow into an adjacent track. This phenomenon is known as adjacent track erasure. Adjacent track erasure is typically detected when a reader reading the victim track sees erasure on the victim track. Note that the active width of the reader is typically smaller than the width of the written track. Assuming the reader is centered on a given victim track for each read, some erasure of the victim track may occur before erasure is detected. Accordingly, adjacent track erasure may be defined as either actual erasure of the victim track, or erasure of enough of the victim track that the reader signal is affected by the erasure.

Embodiments of the present invention use measurement of the growth of the erase band between an "aggressor" track and a "victim" track for a small set of write cycles, e.g., 1, about 10, about 100, about 1000, about 10000, etc. (or higher or lower), to estimate the growth of the erase band for a larger number of write cycles, e.g., >10000, >100000, etc. In one approach, the growth rate of the erase band is used to estimate the number of write cycles that can occur until adjacent track erasure occurs and/or becomes significant for a given track pitch and/or read width.

Accordingly, the estimated number of write cycles on the aggressor track can then be used to estimate the risk or probability of problematic adjacent track erasure for a prescribed number of write cycles, e.g., >10000, >100000, etc., and also to assist in selecting a track pitch. Such estimation is much faster than actually performing >10000 or >100000 write cycles to determine adjacent track erasure.

Figure 4:
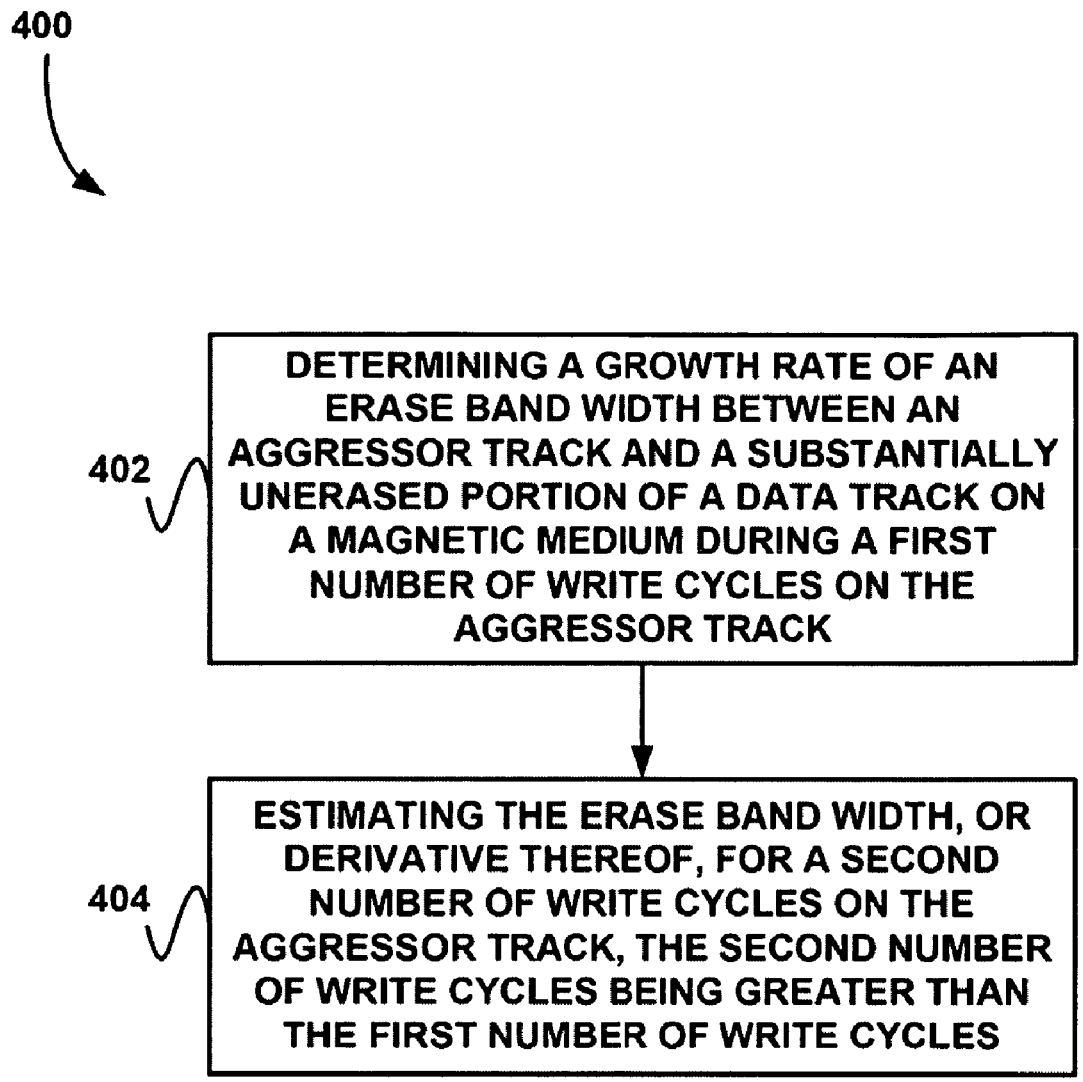
FIG. 4 shows a method for estimating an erase band width, or a derived parameter thereof, after a number of write cycles on an aggressor track, in accordance with one embodiment.

FIG. 4 shows a method 400 for estimating an erase band width, or a derived parameter thereof, for a number of write cycles on an aggressor track, in accordance with one embodiment. As an option, the present method 400 may be implemented in the context of the functionality and architecture of FIGS. 1-3B. Of course, however, the method 400 may be carried out in any desired environment. It should also be noted that the aforementioned definitions may apply during the present description.

As shown, a growth rate of an erase band width between an aggressor track and a substantially unerased portion of a data track on a magnetic medium is determined during a first number of write cycles on the aggressor track. See operation 402. In the context of the present description, an aggressor track refers to any track on a magnetic medium to which data is written, overwritten, and/or erased for the purposes of determining an erase band width on the magnetic medium. For example, in one embodiment, the aggressor track may be a track written in between two data tracks. A data track refers to any track where data is or could be written on a magnetic medium, and may be considered to be a victim track if adjacent the aggressor track. Furthermore, an erase band width refers to the width of a magnetic medium that is affected from writing to a track. In most cases, the erase band width refers to a width on the magnetic medium between the aggressor track and a portion of a data track which is not significantly affected by writing to the aggressor track. Such portion may be the entire data track, or some smaller subsection thereof.

With further reference to FIG. 4, the erase band width, or a derived parameter thereof, is estimated for or after a second number of write cycles on the aggressor track, the second number of write cycles being greater than the first number of write cycles. See operation 404. In other words, though the second number of write cycles are not actually performed, how wide the erase band would be, or some derived parameter thereof, for a second number of write cycles or after a second number of write cycles, is estimated.

In one embodiment, the estimating may be based on a log linear extrapolation of the determined growth of the erase band width. In particularly preferred embodiments, the track pitch selected for the testing is selected such that the erase band expands into the victim track after the first few writes, e.g., there is not a significant gap present between the aggressor and victim tracks as initially written. Because of the log linear increase of the erase width, the erase width over a small number of cycles can be measured and used to extrapolate the erase width for a much larger number of write cycles.

In another embodiment, a derived parameter of the erase band width may be estimated, where the derived parameter is an approximate number of write cycles on the aggressor track before erasure is detectable in the data track.

As an option, a track pitch may also be selected based on the estimating. For instance, once the estimated erase band width is determined, a track pitch which avoids erase band growth into a critical portion of an adjacent track after a selected number of writes, e.g., 1000, 10000, 100000, etc. can be selected for use on the final product.

It should be noted that, in various embodiments, the first and second number of write cycles may vary. For example, in one embodiment, the first number of write cycles may be less than about 1000, e.g., 900, 800, 700, etc. In another embodiment, the first number of write cycles may be less than about 100, e.g., 90, 80, 50, 10, 5. Additionally, as an option, the second number of write cycles may be greater than about 10000. Of course, these are only examples, as the first and second number of write cycles may vary depending on a system and/or application.

In one embodiment, determining the growth rate of the erase band width may include writing the data track and the aggressor track, and measuring the erase band width after at least two different write cycles on the aggressor track. In this case, the growth rate of the erase band width may be determined using Equation 1 below, where R is the rate of growth of the erase band width, $EBW_x$ is the erase band width after x write cycles, and $EBW_y$ is the erase band width after y write cycles.

$$R = \frac{EBW_y - EBW_x}{\log_{10}(y) - \log_{10}(x)} \quad \text{Equation 1}$$

In another embodiment, an erase band width, or derived parameter thereof, adjacent an aggressor track may be estimated for a third number of write cycles on the aggressor track based on a log linear growth rate of the erase band width between first and second numbers of write cycles on the aggressor track, where the third number of write cycles is greater than the first number of write cycles, and the third number of write cycles is greater than the second numbers of write cycles. As an option, the second number of write cycles may be less than about 1000, and the first number of write cycles may be less than the second number of write cycles, and/or the third number of write cycles may be greater than about 10000.

Of course, the number of write cycles may vary in different embodiments. For example, the second number of write cycles may be less than about 100, and the first number of write cycles may be less than the second number of write cycles.

In another embodiment, the magnetic head assembly 300 of FIGS. 3A and 3B may be implemented with a system which includes logic and/or software (including firmware) embodied on a tangible computer readable medium, for determining a growth rate of an erase band width between an aggressor track and a substantially unerased portion of a data track on a magnetic medium during a first number of write cycles on the aggressor track. Additionally, logic or software may be provided for estimating the erase band width, or derived parameter thereof, after a second number of write cycles on the aggressor track, the second number of write cycles being greater than the first number of write cycles.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 5:
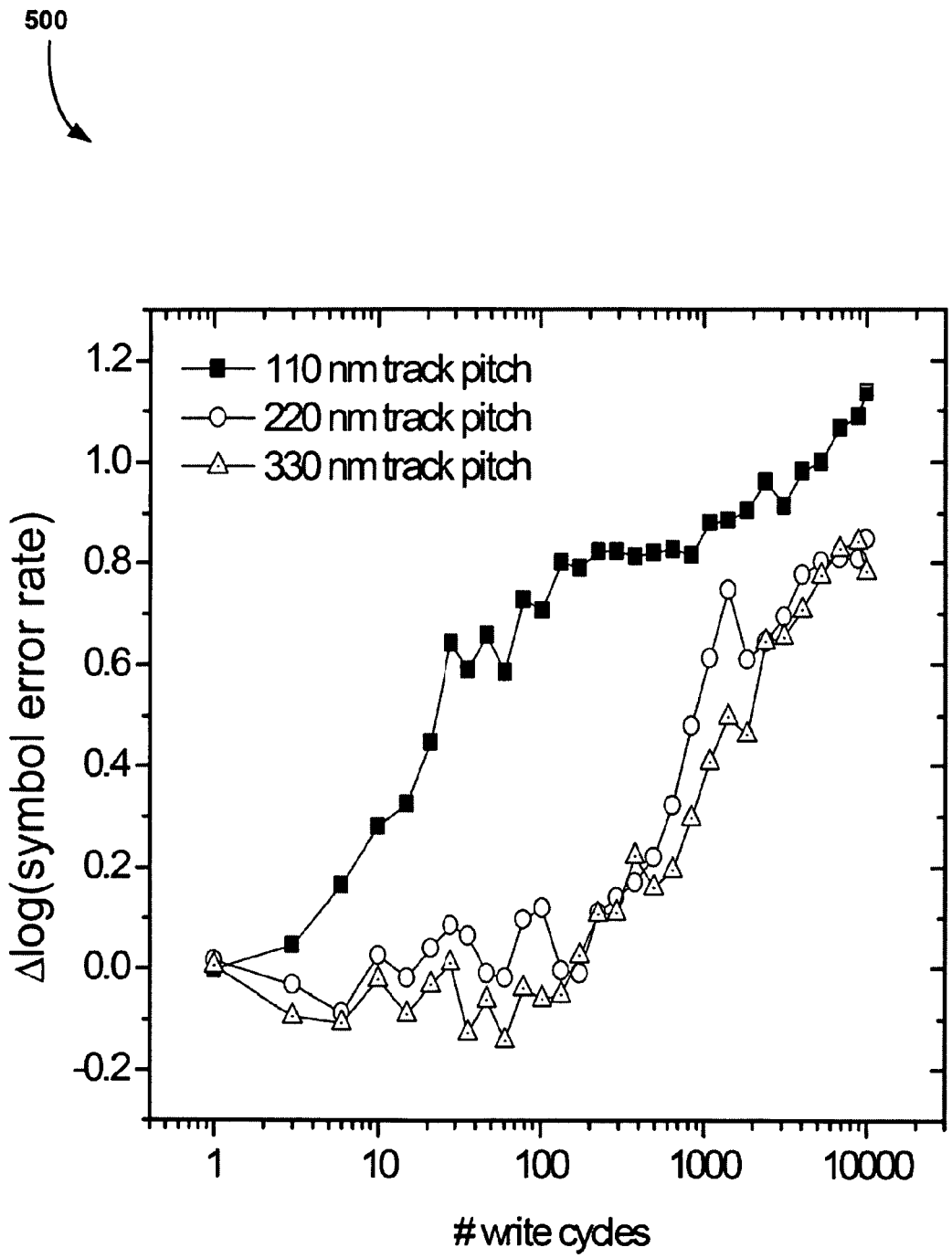
FIG. 5 shows a plot of an adjacent track erasure (ATE) bit error rate (BER) versus a number of write cycles for a magnetic storage system, in accordance with one embodiment.

FIG. 5 shows a plot 500 of an adjacent track erasure (ATE) bit error rate (BER) versus a number of write cycles for a magnetic storage system, in accordance with one embodiment. As an option, the plot 500 may be viewed in the context of the details of FIGS. 1-4. Of course, however, the plot 500 may be viewed in the context of any desired environment. It should also be noted that the aforementioned definitions may apply during the present description.

As shown in the plot 500, an ATE BER [e.g. symbol error rate (SER)] is measured and plotted versus a number of write cycles in a log-linear form for different track pitch widths (110 nm, 220 nm, and 330 nm) for a magnetic write width (MWW) of 123 nm. It should be noted that up to about 100 write cycles the ATE BER appears to be relatively flat with no positive slope for the 220 and 330 nm track pitches. Thus, such data may be misleading unless a sufficient number of write cycles are performed. However, as the number of write cycles increase, the time and cost of testing a magnetic storage device associated with the test increases. Therefore, it is desirable to estimate the ATE using a shorter number of write cycles.

Figure 6:
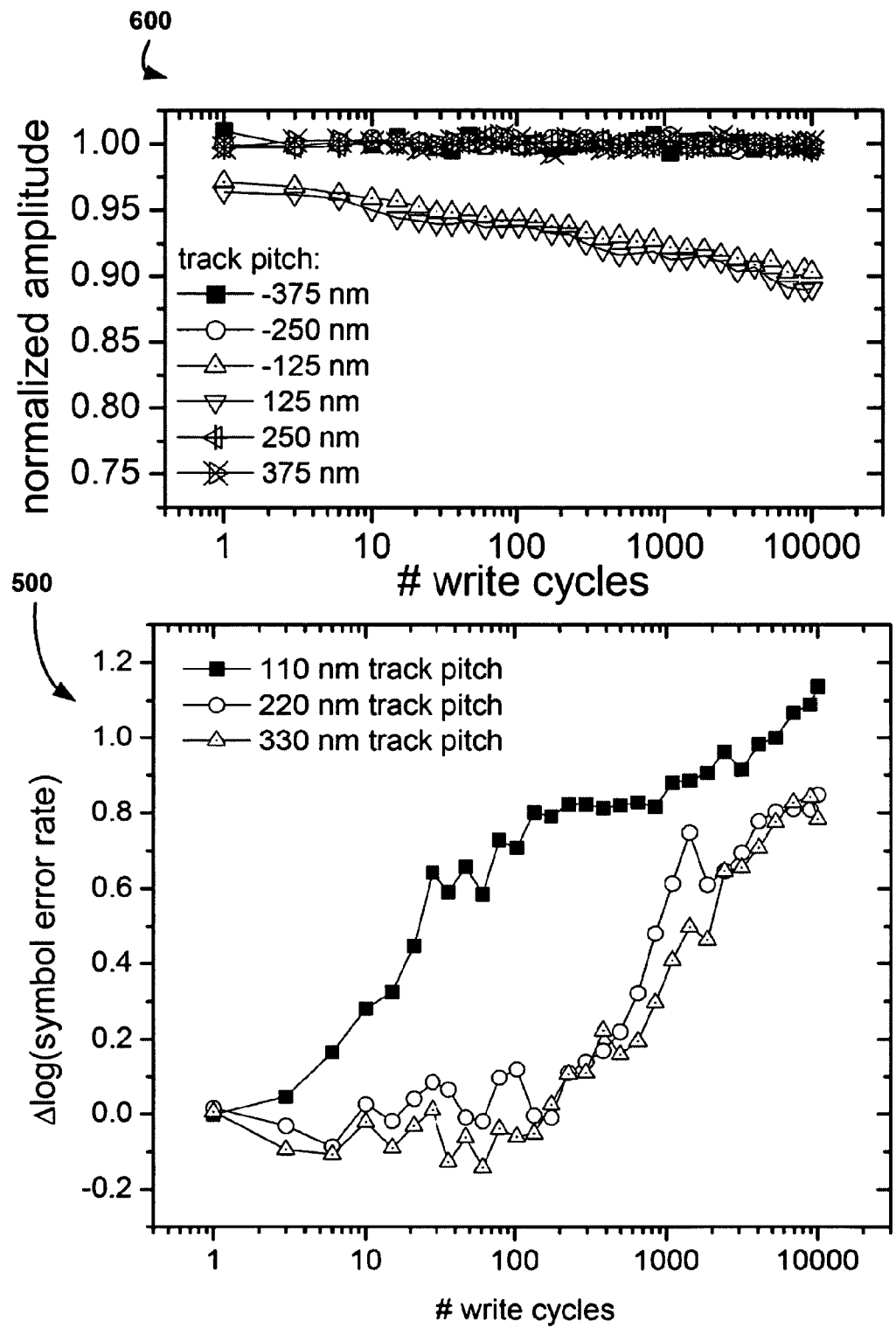
FIG. 6 shows a plot illustrating amplitude decay for determining an estimate of the ATE, in accordance with one embodiment.

FIG. 6 shows a plot 600 illustrating amplitude decay for determining an estimate of the ATE relative to the plot 500 of FIG. 5, in accordance with one embodiment. As shown, measuring amplitude decay does not necessarily show all of the detail for estimating the ATE. For example, at a track pitch greater than 250 nm, there is no amplitude decay for 1000 to 10000 write cycles, despite there being significant ATE BER decay, as shown in plot 500.

Figure 7A:
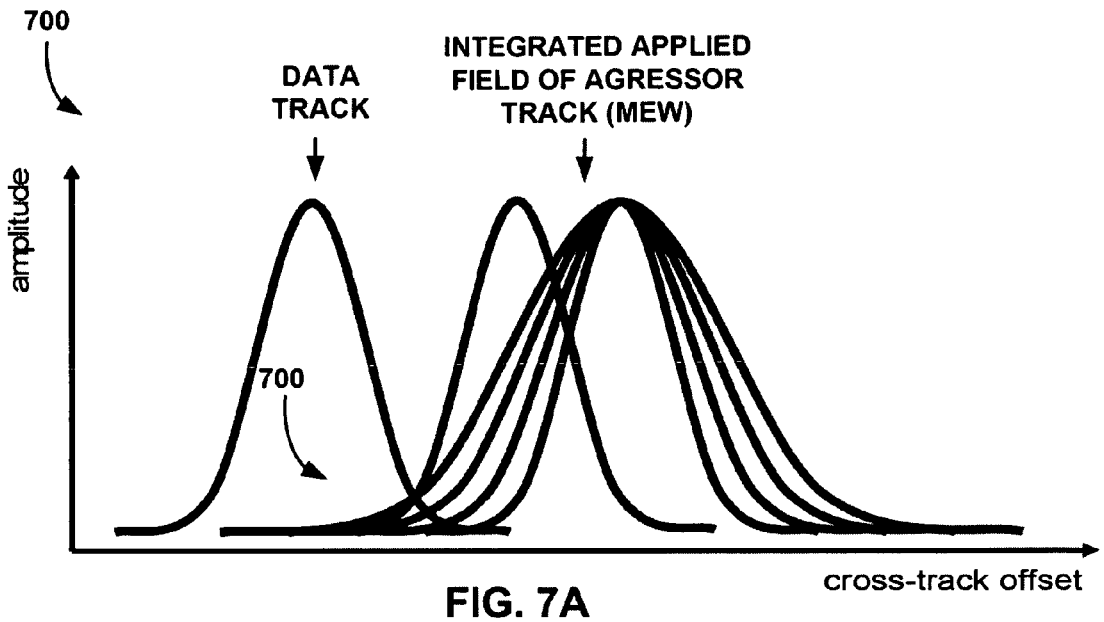
FIGS. 7A and 7B show plots illustrating erase band width increase and a measurement of the erase band width as an ATE predictor, in accordance with one embodiment.
Figure 7B:
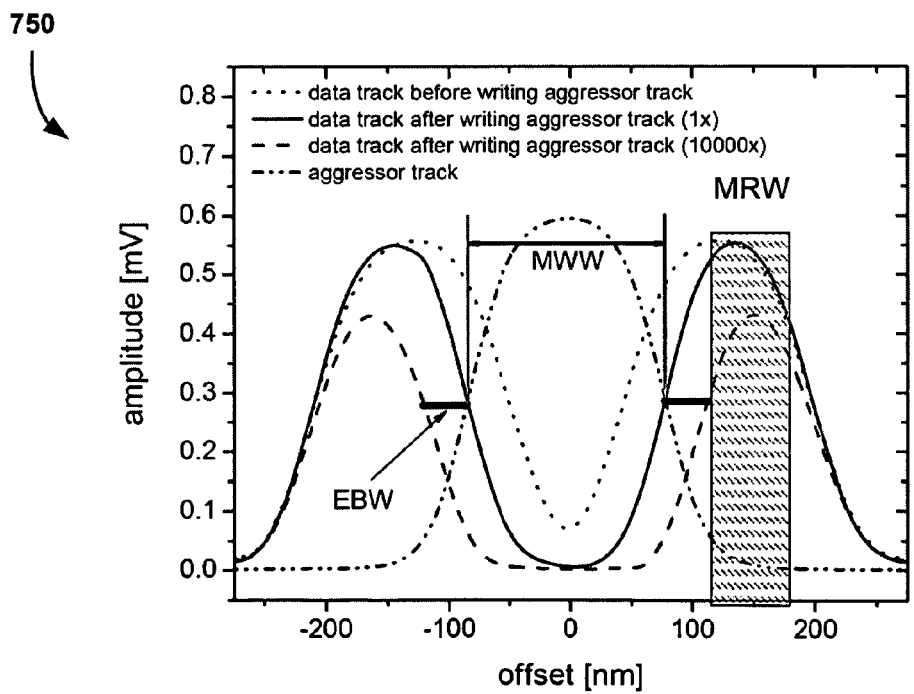

FIGS. 7A and 7B show plots 700 and 750 illustrating erase band width increase and a measurement of the erase band width as an ATE predictor, in accordance with one embodiment. As an option, the plots 700 and 750 may be viewed in the context of the details of FIGS. 1-6. Of course, however, the plots 700 and 750 may be viewed in the context of any desired environment. It should also be noted that the aforementioned definitions may apply during the present description.

As shown in FIG. 7A, the erase band width (EBW) between an aggressor and a data track (e.g. a victim track) increases with the increasing number of write cycles. In this case, measuring the rate of growth of the erase band width may be utilized to estimate the number of cycles that are needed for erasure to be detected by a given magnetic read width (MRW), which is the width of the reader, at a given track pitch.

For example, in one embodiment, a magnetic erase width (MEW) and a magnetic read width (MRW) may be determined; here MEW is the sum of the magnetic write width (MWW) and twice the erase band width (EBW). Subsequently, one data track (e.g. one victim track) and one aggressor track may be written. The erase band width may then be measured for a first and a second number of write cycles using signal readback amplitudes, as shown in FIG. 7B. In this case, the track pitch may be given by the magnetic erase width and criterion to ensure that the erasure begins at the first write.

The measurements may then be utilized to determine a growth rate R of the erase band width EBW. Equation 2 shows one example of a formula for such computation. For exemplary purposes only, the first number of write cycles is chosen to be 10 and the second number of write cycles 100.

$$R = \frac{EBW_y - EBW_x}{\log_{10}(y) - \log_{10}(x)} \quad \text{Equation 2}$$

where if $y > x$, then $R > 0$.

Next, a figure of merit (FOM) or a threshold for the ATE may be determined. Equation 3 shows an example for computing a track point (TP) to use as the threshold, in accordance with one embodiment.

$$TP = EBW + \frac{1}{2}(MRW + MWW) \quad \text{Equation 3}$$

The growth rate R may be utilized to determine the erase band width EBW at some number of writes (e.g. 10 k), and hence a "safe" track pitch (e.g. a corrected track pitch). An example of how to determine the "safe" track pitch is shown in Equation 4.

$$TP = R\log_{10}(10^4) + \frac{1}{2}(MRW + MWW) \quad \text{Equation 4}$$

In one embodiment, the track pitch may be predetermined. In this case, one could solve Equation 3 for EBW (in terms of the particular track pitch) and then R could be used to determine the "safe" number of cycles it would take before the erase band became too large. It should be noted that, in one embodiment, the method described in this example may be applied at an outer diameter, a middle diameter, and an inner diameter of a magnetic medium to account for changes due to skew. In this case, interpolation may be used to obtain zone-by-zone parameters.

As another option, a corrected track pitch may be determined such that the same amount of damage inflicted in a series of write cycles may be inflicted in one write cycle. For example, Equation 5 may be used to determine the corrected track pitch ($TP_{corr}$), where, once found, one data and one aggressor track may be written using the corrected track pitch such that error rate degradation may be measured.

$$TP_{corr} = TP + R * \log_{10}(\text{number of write cycles}) \quad \text{Equation 5}$$

where $TP_{corr}$ is the corrected track pitch,

TP is a track pitch between the aggressor track and victim track during a number of write cycles, and R is the growth rate of the erase band width during the number of write cycles (and $R*\log10$(number of write cycles) is the track pitch correction).

As an option, the described method may further include a calibration step to ensure accuracy. In this case, the threshold EBW may be determined via traditional ATE measurement at different track pitches (e.g. at 10 k write cycles, etc.). Additionally, calibration may be checked intermittently. For example, calibration may be checked at some fixed interval of magnetic storage devices (e.g. drives) in a manufacturing line, or the interval could be correlated to head wafer-to-wafer changes. Furthermore, to avoid track misregistration, which in some cases may be an issue for 100 or less writes, more measurements of erase band width may be taken for averaging or line-fitting (to obtain growth rate).

Figure 8:
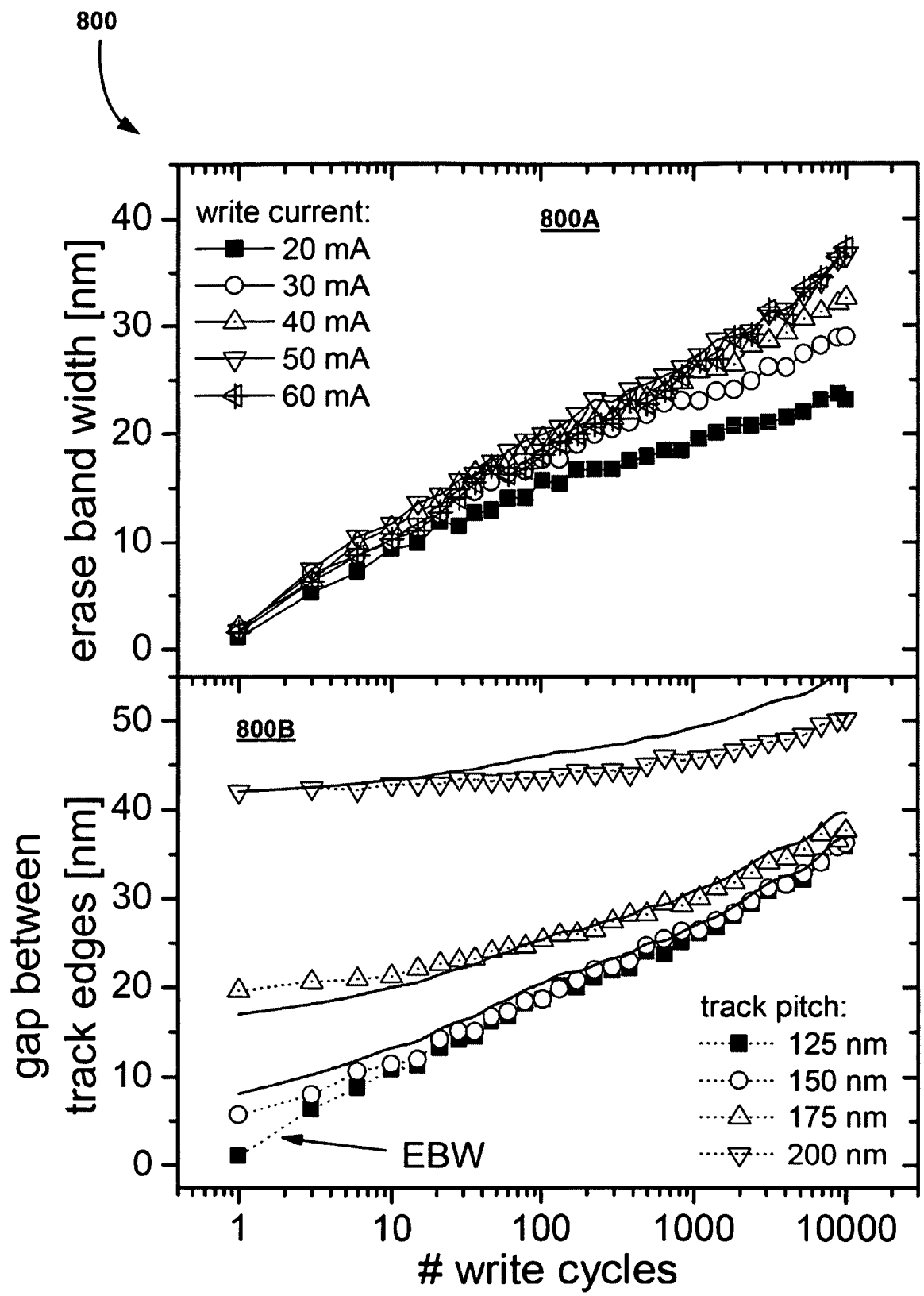
FIG. 8 shows a plot illustrating the log-linear growth of the erase band width and the corresponding gap between an aggressor track and a data track.

FIG. 8 shows a plot 800 illustrating the log-linear growth of the erase band width 800A and the corresponding gap between an aggressor track and a data track 800B. As shown, the erase band width grows log-linearly given there is not a significant gap between the aggressor and victim tracks at the first write (see the 125 nm track pitch curve). In this case, solid lines in the plot 800B are given by Equation 6 shown below, where TP is the track pitch, MEW is the magnetic erase width, GAP is the gap between track edges, and EBW is the erase band width.

$$GAP = \sqrt{(TP-MEW)^2 + EBW^2} \quad \text{Equation 6}$$

Figure 9:
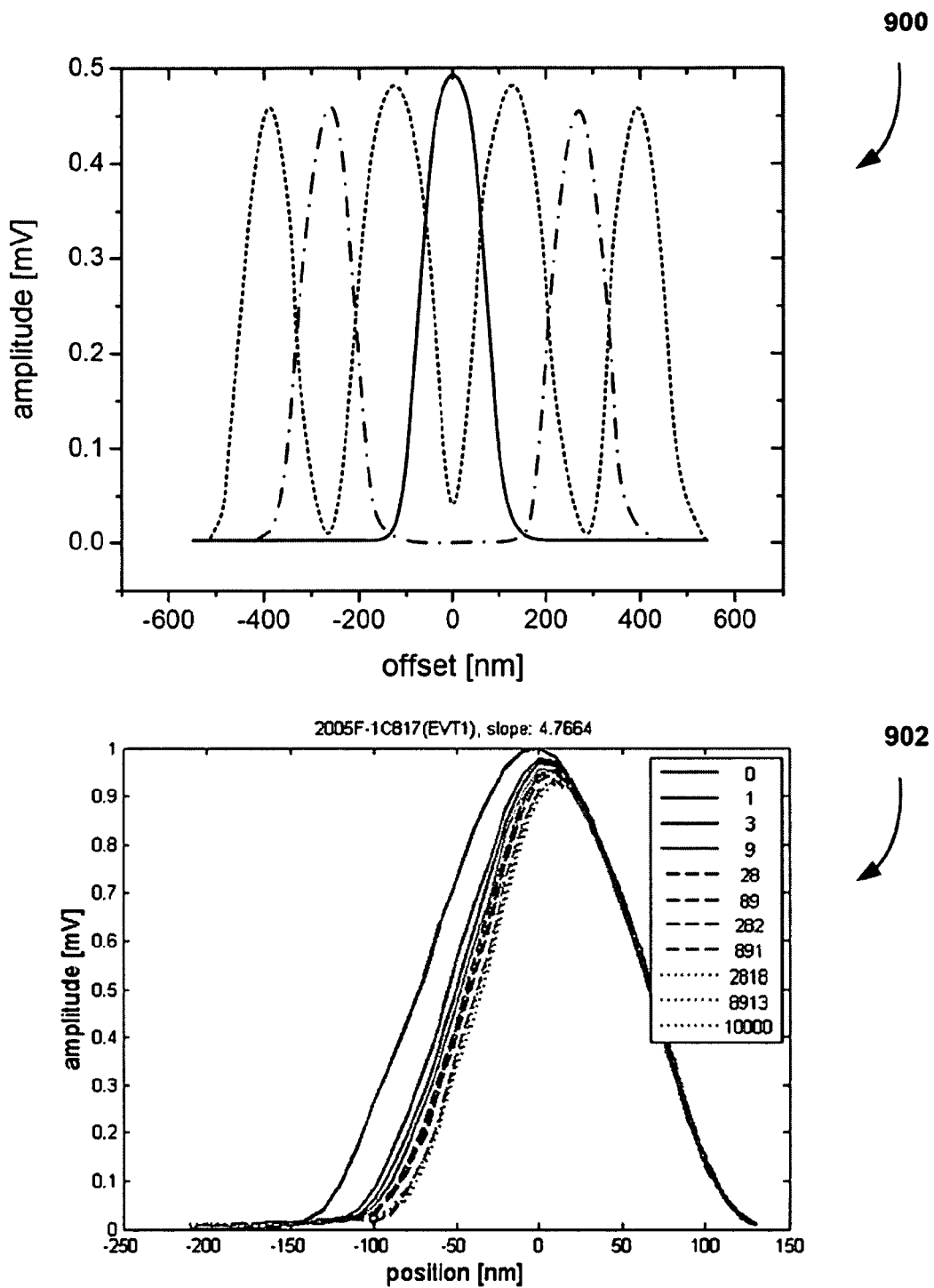
FIG. 9 shows a plot illustrating a technique for writing a data track and an aggressor track at arbitrary frequencies, in accordance with one embodiment.

FIG. 9 shows plot 900 illustrating techniques for writing a data track and an aggressor track at arbitrary frequencies, in accordance with one embodiment. In plot 900, the three line types represent different frequencies at which the tracks are written. The tracks may then be distinguished (e.g., via an overwrite filter) by their frequencies.

Referring to plot 902 of FIG. 9, in another procedure, which is different from that shown in plot 900, a data track and an aggressor track may be written at arbitrary frequencies (e.g. the frequencies may be the same, but may be limited to one data track). In this case, for exemplary purposes, the aggressor track is written at −160 nm for a number of write cycles, represented in the legend. Before measuring a track profile, an alternating current (AC) erase may be used to erase the aggressor track using larger track pitch (e.g. 5% for the presented measurements). As shown, the AC erase track is written at −168 nm. In this case, a parametric (open) filter may be utilized to measure a track profile.

As an option, the plots 900, 902 may be viewed in the context of the details of FIGS. 1-8. Of course, however, the plots 900, 902 may be viewed in the context of any desired environment. It should also be noted that the aforementioned definitions may apply during the present description.

Figure 10:
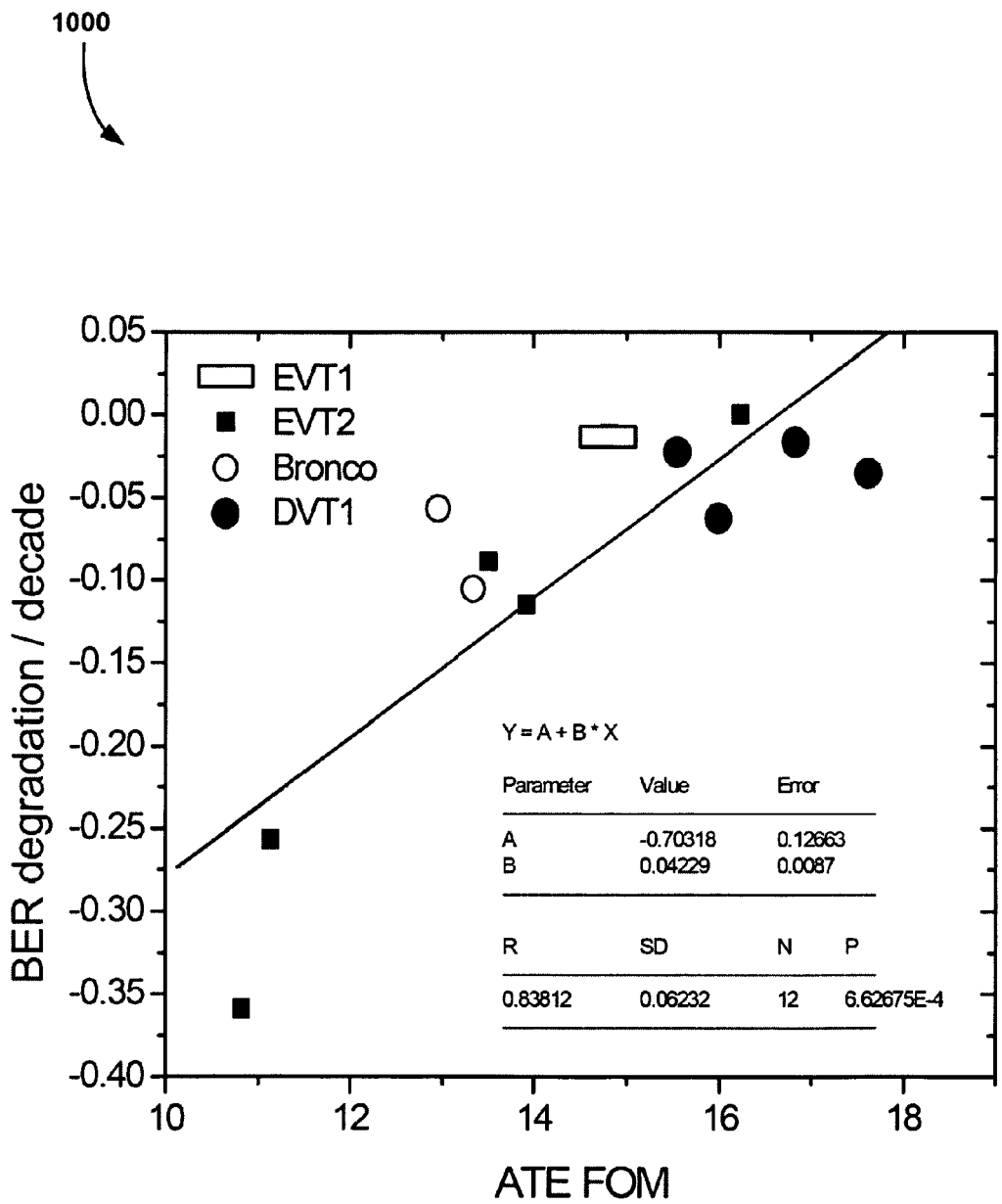
FIG. 10 shows a plot illustrating a technique for determining the accuracy of an ATE figure of merit (FOM), in accordance with one embodiment.

FIG. 10 shows a plot 1000 illustrating a technique for determining an accurate ATE FOM, in accordance with one embodiment. As an option, the plot 1000 may be viewed in the context of the details of FIGS. 1-9. Of course, however, the plot 1000 may be viewed in the context of any desired environment. It should also be noted that the aforementioned definitions may apply during the present description.

As shown, BER degradation data for four magnetic heads is plotted versus an ATE FOM. In this case, Equation 7 shown the formula used to compute the ATE FOM.

$$\text{ATE FOM} = (\text{TP BER} - \text{MW} + \text{MRW})/\text{mean(slope EB)} \quad \text{Equation 7}$$

FIGS. 11A-11D show steps 1100-1130 for performing a drive level erase band width ATE measurement, in accordance with one embodiment. As an option, the steps 1100-1130 may be implemented in the context of the details of FIGS. 1-10. Of course, however, the steps 1100-1130 may be implemented in the context of any desired environment. It should also be noted that the aforementioned definitions may apply during the present description.

Figures 11A, 11B:
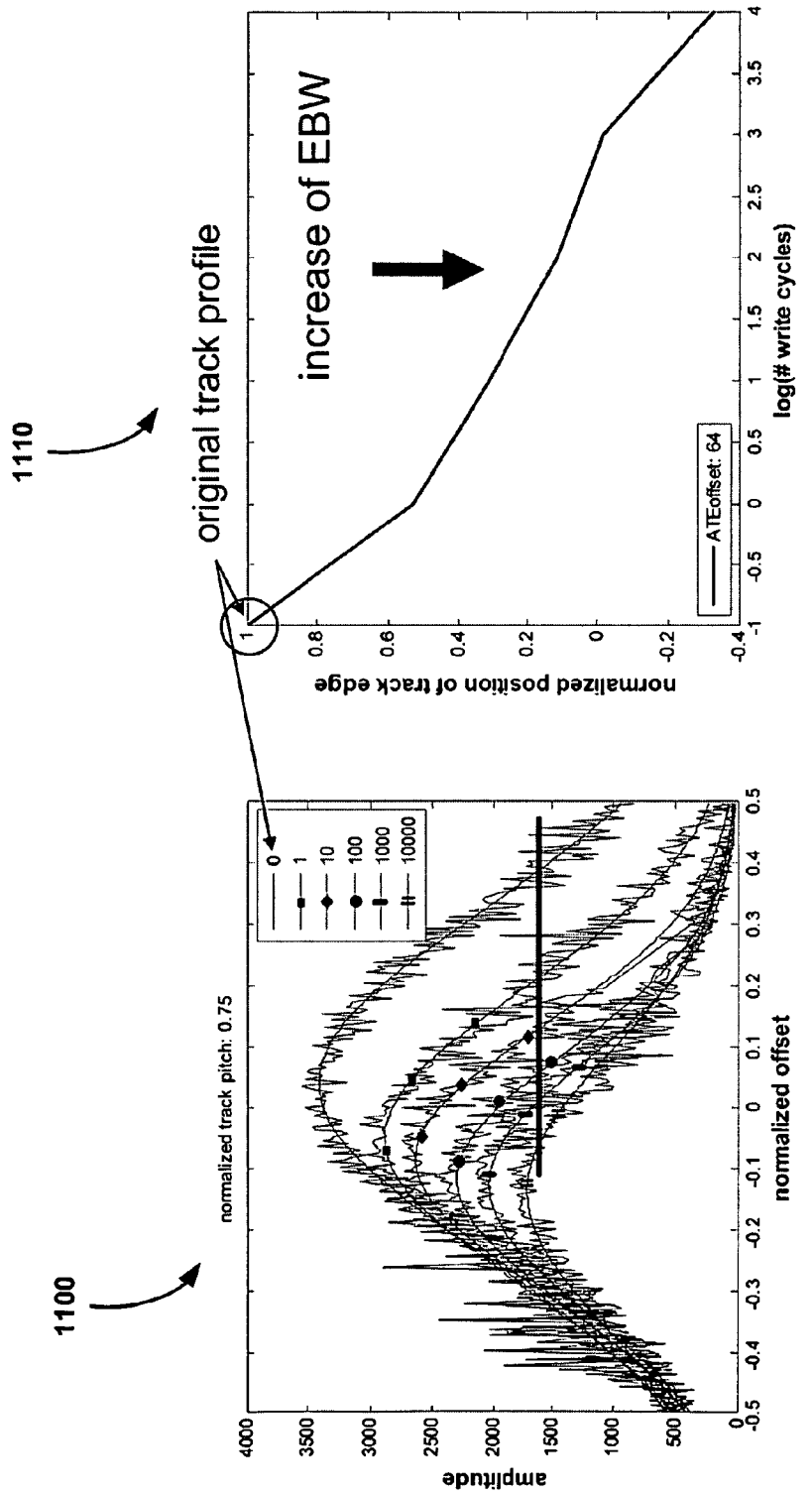
FIGS. 11A-11D show steps for performing a drive level erase band width ATE measurement, in accordance with one embodiment.

As shown in step 1100, an ATE measurement is performed. The growth of the erase band width of the aggressor track is then determined by determining a position of the track edge. In one embodiment, and as shown in FIG. 11A, the 50% point may be used to cut the normalized offset to determine the erase band width. Although, in other embodiments, various other cut points may be utilized. The slope of the growth (e.g. R) is then measured to determine how fast the erase band width grows as the number of write cycles increases, as shown in step 1110 of FIG. 11B.

Figures 11C, 11D:
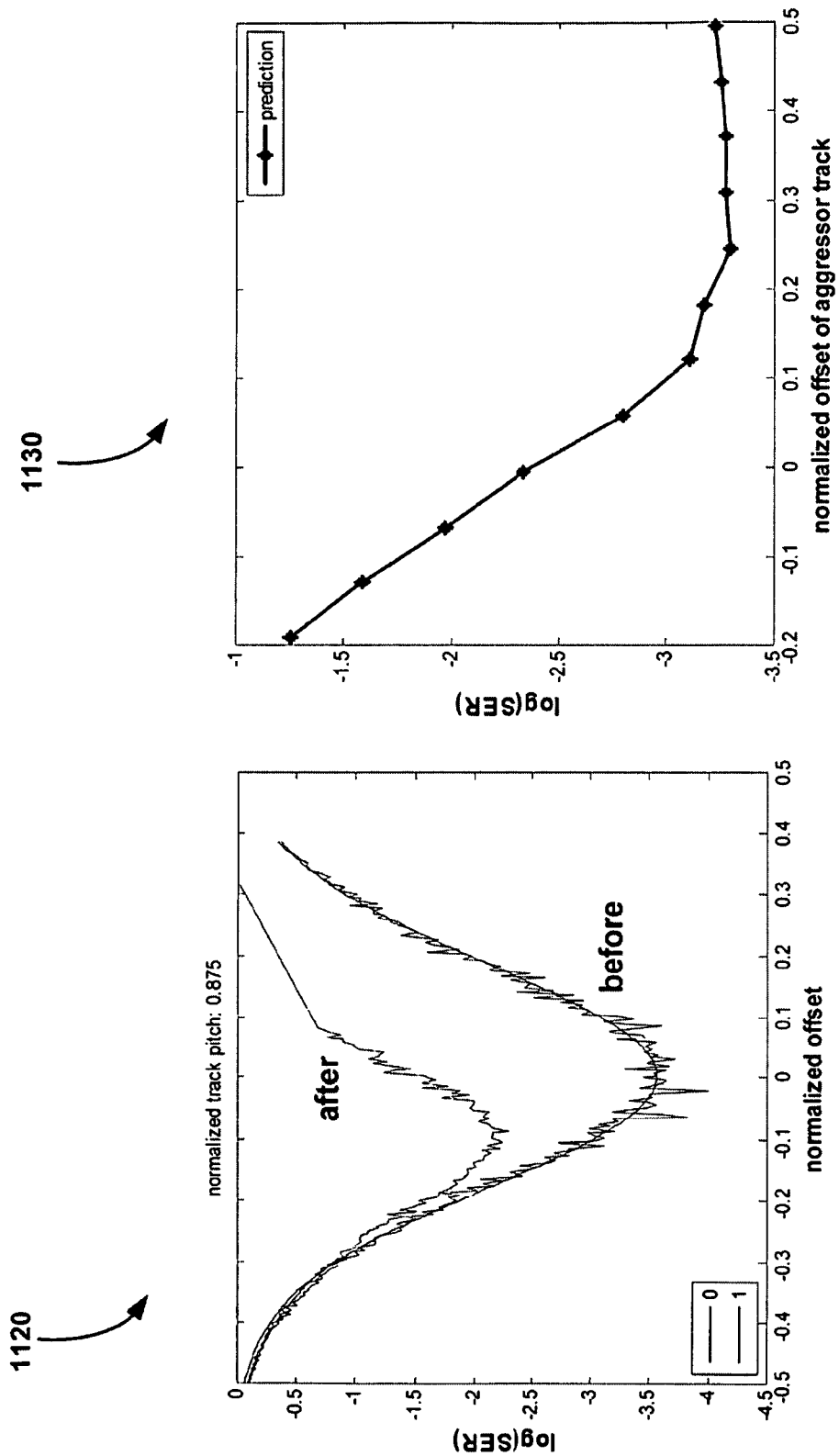

An SER (e.g. a BER) ATE measurement is then performed, as shown in step 1120 of FIG. 11C. In this case, the aggressor track is only written once and Equation 5 is used to determine the corrected track pitch. The SER ATE is then predicted, as shown in step 1130 of FIG. 11D, where 0 corresponds to the nominal track pitch and thermal decay was considered and taken into account (e.g. 0.2 orders of SER attributed to thermal decay).

Figure 12:
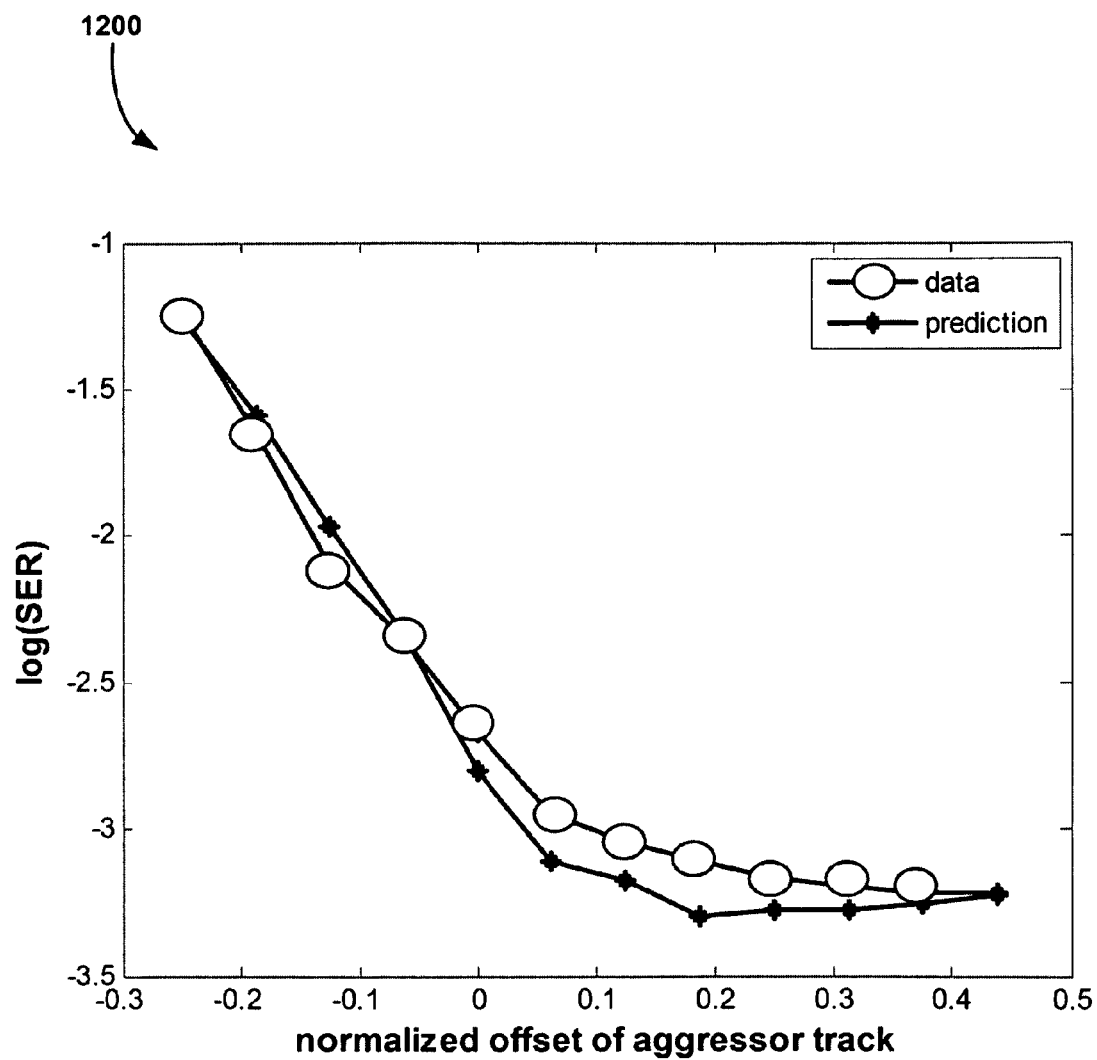
FIG. 12 show a comparison of measured data to predicted values using the steps described in FIGS. 11A-11D, in accordance with one embodiment.

FIG. 12 show a comparison 1200 of measured data to predicted values using the steps described in FIGS. 11A-11D, in accordance with one embodiment. As shown, the measured data and prediction are substantially similar. Furthermore, in this embodiment, which is only one exemplary implementation, the time to complete the data measurement was 900 seconds, whereas the computational time to complete the prediction was 90 seconds. Of course, on various other computational systems such computational time may vary.

It should be noted that methodology presented herein for at least some of the various embodiments may be implemented, in whole or in part, in hardware (e.g., logic), software, by hand, using specialty equipment, etc. and combinations thereof.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   determining a growth rate of an erase band width between an aggressor track and a substantially unerased portion of a data track on a magnetic medium during a first number of write cycles on the aggressor track; and
   estimating the erase band width, or derived parameter thereof, for or after a second number of write cycles on the aggressor track, the second number of write cycles being greater than the first number of write cycles.

2. A method as recited in claim 1, wherein the first number of write cycles is less than about 1000.

3. A method as recited in claim 1, wherein the second number of write cycles is greater than about 10000.

4. A method as recited in claim 1, wherein the first number of write cycles is less than about 100.

5. A method as recited in claim 4, wherein the second number of write cycles is greater than about 10000.

6. A method as recited in claim 1, wherein the estimating is based on a log linear extrapolation of the determined growth of the erase band width.

7. A method as recited in claim 1, wherein a derived parameter of the erase band width is estimated, wherein the derived parameter is an approximate number of write cycles on the aggressor track before erasure is detectable in the data track.

8. A method as recited in claim 1, further comprising selecting a track pitch based on the estimating.

9. A method as recited in claim 1, wherein determining the growth rate of the erase band width further comprises writing the data track and the aggressor track, and measuring the erase band width after at least two different write cycles on the aggressor track.

10. A method as recited in claim 9, wherein the growth rate of the erase band width is determined using the equation:

$$R = \frac{EBW_y - EBW_x}{\log_{10}(y) - \log_{10}(x)}$$

where R is the rate growth of the erase band width,
   $EBW_x$ s the erase band width after x write cycles, and
   $EBW_y$ is the erase band width after y write cycles.

11. A method as recited in claim 1, further comprising determining corrected track pitch using the equation:

$$TP_{corr} = TP + R * \log_{10}(\text{number of write cycles})$$

where $TP_{corr}$ is the correct track pitch,
   TP is a track pitch between the aggressor track and the substantially unerased portion of the data track during the first number of write cycles, and
   R is the growth rate of the erase band width.

12. A method, comprising:
   estimating an erase band width, or derived parameter thereof, adjacent an aggress track for a third number of write cycles on the aggressor track based on a log linear growth rate of the erase band width between first and second numbers of write cycles on the aggressor track,
   wherein the third number of write cycles is greater than the first number of write cycles,
   wherein the third number of write cycles is greater than the second numbers of write cycles.

13. A method as recited in claim 12, wherein the second number of write cycles is less than about 1000, wherein the first number of write cycles is less than the second number of write cycles.

14. A method as recited in claim 13, wherein the third number of write cycles is greater than about 10000.

15. A method as recited in claim 12, wherein the second number of write cycles is less than about 100, wherein the first number of write cycles is less than the second number of write cycles.

16. A method as recited in claim 15, wherein the third number of write cycles is greater than about 10000.

17. A method as recited in claim 12, wherein the estimating is based on a log linear extrapolation of the determined growth of the erase band width.

18. A method as recited in claim 12, wherein a derived parameter of the erase band width is estimated, wherein the derived parameter is an approximate number of write cycles on the aggressor track before erasure is detectable in the data track.

19. A method as recited in claim 12, further comprising, selecting, a track pitch based on the estimating.

20. A method as recited in claim 12, wherein determining the growth rate of the erase band width further comprises writing the data track and the aggressor track, and measuring the erase band width after at least two different write cycles on the aggressor track.

21. A method as recited in claim 20, wherein the growth rate of the erase band width is determined using the equation:

$$R = \frac{EBW_y - EBW_x}{\log(y) - \log(x)}$$

where R is the rate of growth of the erase band width,
$EBW_x$ is the erase band width after x write cycles, and
$EBW_y$ is the erase band width after y write cycles.

22. A method as recited in claim 12, further comprising determining a corrected track pitch using the equation:

$$TP_{corr} = TP + R*\log_{10}(\text{number of write cycles})$$

where $TP_{corr}$ is the corrected track pitch,
TP is a track pitch between the aggressor track and the substantially unerased portion of the data track during the first number of write cycles, and
R is the growth rate of the erase band width.

23. A system, comprising:
logic or software for determining a growth rate of an erase band width between an aggressor track and a substantially unerased portion of a data track on a magnetic medium during a first number of write cycles on the aggressor track; and
logic or software for estimating the erase band width, or derived parameter thereof, for or after a second number of write cycles on the aggressor track, the second number of write cycles being greater than the first number of write cycles.

24. A computer program product embodied on a computer readable medium which when executed causes a computer to perform the following operations, comprising:
determining a growth rate of an erase band width between an aggressor track and a substantially unerased portion of a data track on a magnetic medium during a first number of write cycles on the aggressor track; and
estimating the erase band width, or derived parameter thereof, for or after a second number of write cycles on the aggressor track, the second number of write cycles being greater than the first number of write cycles.

* * * * *

UNITED STATES PATENT AND TRADEMARK OFFICE
CERTIFICATE OF CORRECTION

| | |
|---|---|
| PATENT NO. | : 7,768,729 B2 |
| APPLICATION NO. | : 12/023980 |
| DATED | : August 3, 2010 |
| INVENTOR(S) | : Moser et al. |

It is certified that error appears in the above-identified patent and that said Letters Patent is hereby corrected as shown below:

col. 1, line 28 replace "beads" with --heads--;

col. 12, line 30 replace "correct" with --corrected--;
col. 12, line 37 replace "aggress" with --aggressor--.

Signed and Sealed this

Twelfth Day of October, 2010

David J. Kappos
*Director of the United States Patent and Trademark Office*